(No Model.)
M. M. M. SLATTERY.
INDUCTION COIL.
No. 358,415. Patented Feb. 22, 1887.
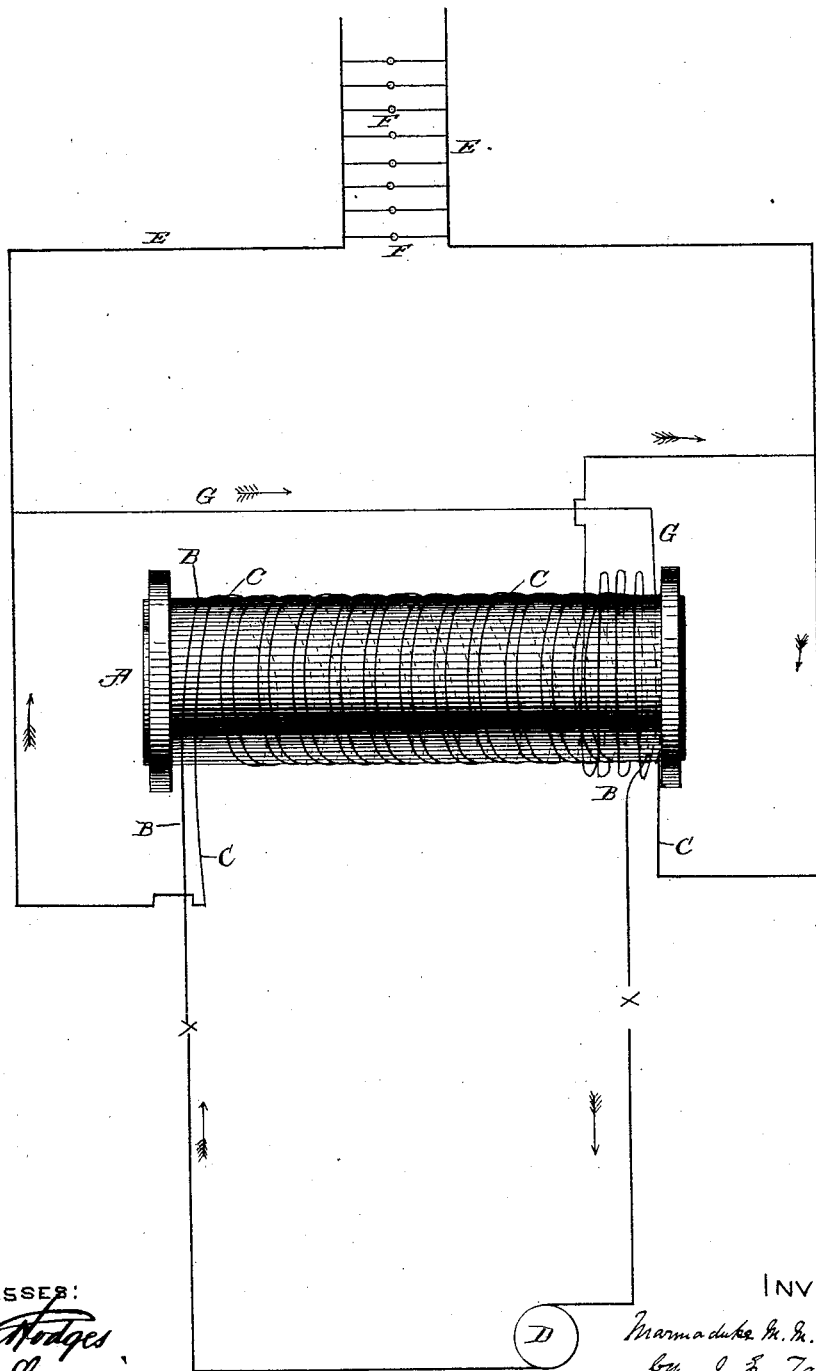
WITNESSES:
Chas Hodges
Chas Currier
INVENTOR,
Marmaduke M. M. Slattery
by J. E. Talbot
his attorney.

UNITED STATES PATENT OFFICE.

MARMADUKE M. M. SLATTERY, OF WOBURN, MASSACHUSETTS, ASSIGNOR TO THE SUN ELECTRIC COMPANY, OF MAINE.

INDUCTION-COIL.

SPECIFICATION forming part of Letters Patent No. 358,415, dated February 22, 1887.

Application filed September 24, 1886. Serial No. 214,420. (No model.)

*To all whom it may concern:*

Be it known that I, MARMADUKE M. M. SLATTERY, of Woburn, in the county of Middlesex and State of Massachusetts, have invented certain new and useful Improvements in Induction-Coils, of which the following is a specification.

The object of my invention is to produce a secondary generator of electricity operating by induction, which shall be self-regulating under changes of load in the secondary or working circuit. I am aware that induction-generators of this class have been described or used which have to some extent been automatically regulated, but they have necessitated the use of external and additional apparatus and the employment of movable parts to effect the end desired.

My present invention obviates the necessity for the employment of any movable parts or other apparatus, the regulation being effected automatically by the method of construction of the generator itself, thus avoiding complication, liability to get out of order, and also extra cost, while at the same time it is perfectly efficient.

In constructing my improved generator I wind the primary and secondary coils on a suitable core in any of the well-known modes or otherwise, the extremities of the secondary being led off to the working-circuit in the ordinary way. From this secondary circuit I take a shunt or derived circuit of comparatively high resistance and wind the wire composing the same around the core of the generator, but in a contrary sense, so that the effect produced by the coil thus formed shall be opposed to the current flowing in the secondary circuit. This regulating-coil being of comparatively high resistance, the current in such coil, when the induction-generator is working under full load, is very small, scarcely any energy is absorbed by it, and its effect is practically *nil*. Should, however, a translating device be removed from circuit, more current in proportion will pass around the regulating-coil and its counter effect will be increased. On the successive removal of further translating devices from circuit the proportion of current flowing around the regulating-coil will correspondingly further increase its opposing effect rising with each successive removal, and the total current induced in the secondary correspondingly lessened. When translating devices are cut into circuit, the reverse action will take place.

Referring to the drawings, A is the core of the generator; B and C, the primary and secondary coils, respectively, wound thereon. D is a dynamo-electric machine or other source of electrical energy with which the primary wire is in circuit; E, the external secondary or working circuit, F F being translating devices therein. G is a derived circuit of comparatively high resistance, also wound upon the same core as but contrariwise to the secondary coil.

Now, if one of the translating devices F be removed from circuit, the resistance of the secondary circuit will be increased and a greater proportion of current will flow through the derived circuit and coil G, producing a counter electro-motive force and preventing any undue excess of current in the remaining translating devices. If another be removed, still more current in proportion will pass through the regulating-coil, producing a greater proportionate counter electro-motive force and preserving the proper current in the secondary circuit for the translating devices therein. On reversal of this action a contrary effect will be produced.

Having thus described my invention, what I claim as new, and desire to secure by Letters Patent of the United States, is—

1. An induction-generator of electricity, consisting of a primary coil, a secondary coil, and a regulating-coil, all wound upon the same core.

2. In secondary generators of electricity operating by induction, a regulating-coil upon the same core as the primary and secondary wires, such coil being wound in the opposite sense to the secondary.

3. In a secondary generator operating by induction, a derived coil from and wound upon the same core as the secondary coil, but in an opposite sense thereto.

4. In a secondary generator of electricity operating by induction, a shunt or derived coil of comparatively high resistance wound in the opposite sense to and in derivation from the secondary coil, whereby on increase of resistance in the secondary circuit a greater proportion of current will flow around such derived coil, producing counter electro-motive force, for the purposes and substantially as herein described.

5. In induction-generators of electricity, a regulating-coil in derivation from the secondary circuit wound on the same core as the secondary coil, but connected with opposite polarity thereto.

Dated this 20th day of September, 1886.

MARMADUKE M. M. SLATTERY,

Witnesses:
J. E. TALBOT,
E. C. LUCE.